(12) United States Patent
Kato

(10) Patent No.: US 9,341,839 B2
(45) Date of Patent: *May 17, 2016

(54) ELECTROWETTING DISPLAY DEVICE AND DYE COMPOSITION FOR ELECTROWETTING DISPLAY

(71) Applicant: FUJIFILM CORPORATION, Minato-ku, Tokyo (JP)

(72) Inventor: Takashi Kato, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 236 days.

This patent is subject to a terminal disclaimer.

(21) Appl. No.: 13/940,216

(22) Filed: Jul. 11, 2013

(65) Prior Publication Data

US 2014/0049807 A1 Feb. 20, 2014

(30) Foreign Application Priority Data

Aug. 17, 2012 (JP) ................................ 2012-181171

(51) Int. Cl.
*C09D 11/50* (2014.01)
*C09B 47/00* (2006.01)
*G02B 26/00* (2006.01)

(52) U.S. Cl.
CPC .............. *G02B 26/005* (2013.01); *C09B 47/00* (2013.01)

(58) Field of Classification Search
CPC ....... C09D 11/50; G02B 26/005; C09B 47/00
USPC ............... 106/31.49; 359/228, 290, 291, 292, 359/665, 666; 252/586
See application file for complete search history.

(56) References Cited

U.S. PATENT DOCUMENTS

| | | | |
|---|---|---|---|
| 2009/0085909 A1* | 4/2009 | Chen .................. | G09G 3/348 345/214 |
| 2010/0173134 A1* | 7/2010 | Khokhlov ............. | H01L 51/442 428/174 |
| 2012/0092753 A1 | 4/2012 | Heikenfeld et al. | |
| 2013/0301110 A1* | 11/2013 | Kato .................... | G02B 26/005 359/290 |

FOREIGN PATENT DOCUMENTS

JP 2-250883 A 10/1990
JP 2009-86668 A 4/2009

* cited by examiner

*Primary Examiner* — Helene Klemanski
(74) *Attorney, Agent, or Firm* — Solaris Intellectual Property Group, PLLC

(57) ABSTRACT

An electrowetting display device that includes a display member having: a first substrate, at least one surface of which is electroconductive, a second substrate disposed so as to face the electroconductive surface of the first substrate, a hydrophobic insulation film disposed at the side of the electroconductive surface of the first substrate, a non-electroconductive oil provided movably on the hydrophobic insulation film and containing a nonpolar solvent and a porphyrin dye represented by Formula (1), and an electroconductive hydrophilic liquid that contacts the oil.

Formula (1)

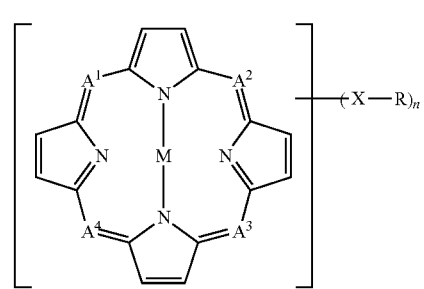

In Formula (I), $A^1$ to $A^4$: N or $—C(R^1)=$; M: metal atom, metal oxide, metal hydroxide, metal halogenide or 2H; R: $C_{4-30}$ alkyl; X: single bond, O, S or $—N(R^2)—$; $R^1$: H, alkyl, aryl or $—X^{11}—R^{11}$; $R^2$: H, alkyl or aryl; $R^{11}$: $C_{4-30}$ alkyl; $X^{11}$: single bond, O, S or $—N(R^{12})—$; $R^{12}$: H, alkyl or aryl; and n: 1-8.

16 Claims, 1 Drawing Sheet

ELECTROWETTING DISPLAY DEVICE AND DYE COMPOSITION FOR ELECTROWETTING DISPLAY

CROSS-REFERENCE TO RELATED APPLICATION

This application claims priority under 35 USC 119 from Japanese Patent Application No. 2012-181171 filed on Aug. 17, 2012, the disclosure of which is incorporated by reference herein.

BACKGROUND OF THE INVENTION

1. Technical Field

The present invention relates to an electrowetting display device and a dye composition for an electrowetting display.

2. Background Art

Conventionally, research has been conducted related to optical elements equipped with a cell including two or more kinds of liquid that do not mix with each other (for example, an oil and a hydrophilic liquid), which are operated (driven) by application of voltage. Examples of such optical elements include an optical shutter, a variable focal length lens, and an image display device. In recent years, a technology utilizing the electrowetting phenomenon has attracted particular attention.

As an example of a technology utilizing the electrowetting phenomenon, an electrowetting display (an electrowetting display device) is known that includes: a first substrate and a second substrate which face each other; plural projections which are arranged to define plural pixel units; a non-conductive first fluid which is sealed in a pixel unit between two adjacent projections; and a second fluid which is a conductive or polar liquid that is immiscible with the first fluid (see, for example, Japanese Patent Application Laid-Open (JP-A) No. 2009-86668).

Further, it is known that porphyrin can be used as a dye for an electrowetting display device (see, for example, U.S. Patent Application Publication No. 2012/0092753).

As the porphyrin, for example, a fluorine-substituted porphyrin is known (see, for example, JP-A No. 2-250883).

SUMMARY OF INVENTION

According to an aspect of the invention, an electrowetting display device that includes a display member having: a first substrate, at least one surface of which is electroconductive, a second substrate disposed so as to face the electroconductive surface of the first substrate, a hydrophobic insulation film disposed on the electroconductive surface of the first substrate, a non-electroconductive oil that is provided movably on the hydrophobic insulation film and contains a nonpolar solvent and a porphyrin dye represented by Formula (1), and an electroconductive hydrophilic liquid that contacts the oil, which exhibits excellent responsiveness at the time of image display, and with which image disorder due to a back flow phenomenon is suppressed, and a dye composition for the electrowetting display, are provided.

In the electrowetting display devices described above, there are cases in which a non-conductive oil (composition) including a nonpolar solvent and a dye is used as a fluid that effects image display.

However, when a porphyrin dye is used as the dye contained in this oil, there are cases in which the solubility of the dye with respect to the nonpolar solvent is insufficient. Further, even in a case in which a porphyrin dye that exhibits a certain degree of solubility with respect to the nonpolar solvent is used, the responsiveness at the time of image display may be insufficient, or image disorder due to a back flow phenomenon may occur.

Here, the "back flow" is a phenomenon in which the area of oil, which has been reduced by shrinkage, gets larger with time, when kept in a state of voltage application.

The present invention has been made in view of the above problems and aims to accomplish the following. Namely, an object of the invention is to provide an electrowetting display device that includes a porphyrin dye having excellent solubility with respect to a nonpolar solvent and exhibits excellent responsiveness at the time of image display, and with which image disorder due to the back flow phenomenon is suppressed, and a dye composition for an electrowetting display.

The present inventors have found that a specific porphyrin dye exhibits excellent solubility with respect to a nonpolar solvent and that, in an electrowetting display device using this porphyrin dye, responsiveness is improved and image disorder is suppressed. The present invention has been accomplished on the basis of this knowledge.

Namely, specific means for achieving the above objects are as follows.

<1> An electrowetting display device including a display member having: a first substrate, at least one surface of which is at least partly electroconductive; a second substrate disposed so as to face the at least partly electroconductive surface of the first substrate; a hydrophobic insulation film disposed on at least a part of the at least partly electroconductive surface of the first substrate; non-electroconductive oil that is provided movably on the hydrophobic insulation film, between the hydrophobic insulation film and the second substrate, and that includes a nonpolar solvent and a porphyrin dye represented by the following Formula (1), and an electroconductive hydrophilic liquid provided between the hydrophobic insulation film and the second substrate so as to contact the oil, wherein an image is displayed by changing the shape of an interface between the oil and the hydrophilic liquid by applying a voltage between the hydrophilic liquid and the at least partly electroconductive surface of the first substrate:

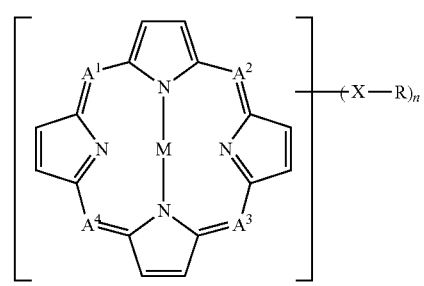

Formula (1)

In Formula (1), each of $A^1$ to $A^4$ independently represents a nitrogen atom or $—C(R^1)=$; M represents a metal atom, a metal oxide, a metal hydroxide, a metal halogenide or two hydrogen atoms; $—X—R$ represents a monovalent group that substitutes to a pyrrole ring; R represents an alkyl group having 4 to 30 carbon atoms; X represents a single bond, an oxygen atom, a sulfur atom or $—N(R^2)—$; $R^1$ represents a hydrogen atom, an alkyl group, an aryl group or $—X^{11}—R^{11}$; $R^2$ represents a hydrogen atom, an alkyl group or an aryl group; $R^{11}$ represents an alkyl group having 4 to 30 carbon atoms; $X^{11}$ represents a single bond, an oxygen atom, a sulfur atom or —N(R$^{12}$)—; R$^{12}$ represents a hydrogen atom, an alkyl group or an aryl group; and n represents an integer from 1 to 8.

<2> The electrowetting display device according to the item <1>, wherein, in Formula (1), each of R and R$^{11}$ independently represents a branched alkyl group.

<3> The electrowetting display device according to the item <1> or the item <2>, wherein, in Formula (1), each of R and R$^{11}$ independently represents an alkyl group having 4 to 20 carbon atoms.

<4> The electrowetting display device according to any one of the items <1> to <3>, wherein, in Formula (1), each of A$^1$ to A$^4$ represents a nitrogen atom.

<5> The electrowetting display device according to the item <4>, wherein, in —X—R in Formula (1), X represents a single bond, an oxygen atom or a sulfur atom, and R represents an alkyl group having 8 to 10 carbon atoms, a fluoroalkyl group having 8 to 10 carbon atoms or an alkoxyalkyl group having 8 to 10 carbon atoms.

<6> The electrowetting display device according to the item <4>, wherein, in Formula (1), —X—R represents —S—CH$_2$—CH(C$_2$H$_5$)—C$_4$H$_9$.

<7> The electrowetting display device according to any one of the items <1> to <6>, wherein the hydrophobic insulation film is a film including a fluorocarbon based polymer.

<8> The electrowetting display device according to any one of the items <1> to <7>, wherein a concentration of the porphyrin dye represented by Formula (1) in the non-electroconductive oil is from 1% by mass to 65% by mass.

<9> The electrowetting display device according to any one of the items <1> to <8>, wherein a relative dielectric constant of the non-electroconductive oil is in a range of from 2.0 to 10.0.

<10> The electrowetting display device according to any one of the items <1> to <9>, wherein a viscosity of the non-electroconductive oil is in a range of from 0.01 mPa·s to 10 mPa·s.

<11> The electrowetting display device according to any one of the items <1> to <10>, wherein an amount of dissolved oxygen in the non-polar solvent is in a range of 10 ppm or less.

<12> The electrowetting display device according to any one of the items <1> to <11>, wherein the hydrophilic liquid includes water and an electrolyte, and a content of the electrolyte is in a range of from 0.1 mol/L to 10 mol/L.

<13> A dye composition for an electrowetting display, the dye composition including a non-polar solvent and a porphyrin dye represented by the following Formula (1):

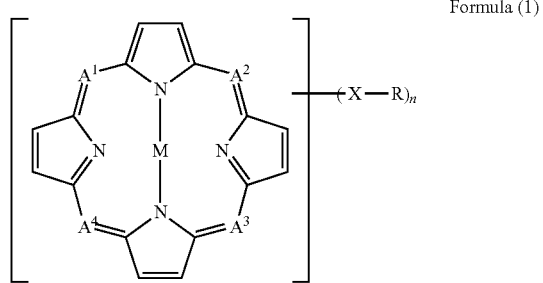

Formula (1)

In Formula (1), each of A$^1$ to A$^4$ independently represents a nitrogen atom or —C(R$^1$)=; M represents a metal atom, a metal oxide, a metal hydroxide, a metal halogenide or two hydrogen atoms; —X—R represents a monovalent group that substitutes to a pyrrole ring; R represents an alkyl group having 4 to 30 carbon atoms; X represents a single bond, an oxygen atom, a sulfur atom or —N(R$^2$)—; R$^1$ represents a hydrogen atom, an alkyl group, an aryl group or —X$^{11}$—R$^{11}$; R$^2$ represents a hydrogen atom, an alkyl group or an aryl group; R$^{11}$ represents an alkyl group having 4 to 30 carbon atoms; X$^{11}$ represents a single bond, an oxygen atom, a sulfur atom or —N(R$^{12}$)—; R$^{12}$ represents a hydrogen atom, an alkyl group or an aryl group; and n represents an integer from 1 to 8.

<14> The dye composition for an electrowetting display according to the item <13>, wherein, in Formula (1), each of R and R$^{11}$ independently represents a branched alkyl group.

<15> The dye composition for an electrowetting display according to the item <13> or the item <14>, wherein, in Formula (1), each of R and R$^{11}$ independently represents an alkyl group having 4 to 20 carbon atoms.

<16> The dye composition for an electrowetting display according to any one of the items <13> to <15>, wherein, in Formula (1), each of A$^1$ to A$^4$ represents a nitrogen atom.

Effect of the Invention

According to the present invention, an electrowetting display device which includes a porphyrin dye having excellent solubility with respect to a nonpolar solvent and exhibits excellent responsiveness at the time of image display, and with which image disorder due to a back flow phenomenon is suppressed, and a dye composition for an electrowetting display may be provided.

DESCRIPTION OF EMBODIMENTS

Hereinafter, exemplary embodiments of the electrowetting display device are explained in detail with reference to the drawings, and through the explanation, the dye composition for an electrowetting display is also described in detail. However, it should be construed that the present invention is not limited to the following exemplary embodiments.

A first exemplary embodiment of the electrowetting display device of the present invention is described in detail with reference to FIG. 1 and FIG. 2. In the present exemplary embodiment, a glass substrate equipped with ITO is used as the first substrate, at least one surface of which is at least partly electroconductive, decane is used as the nonpolar solvent that constitutes the oil, and an aqueous electrolyte solution is used as the hydrophilic liquid.

Figure 1:
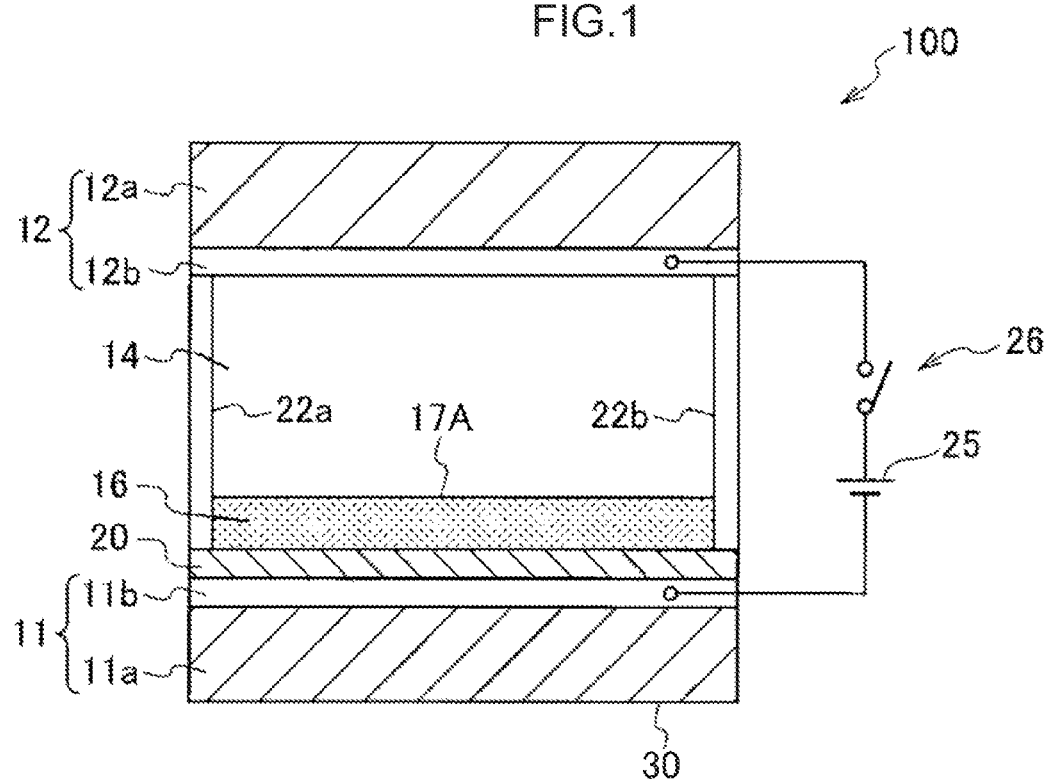
FIG. 1 is a schematic sectional view illustrating a state of voltage being not applied (voltage off state) of the electrowetting display device of an exemplary embodiment of the present invention.

As shown in FIG. 1, the electrowetting display device 100 of the present exemplary embodiment is equipped with substrate (first substrate) 11, at least one surface of which is at least partly electroconductive, substrate (second substrate) 12, at least one surface of which is at least partly electroconductive and is arranged so as to face the substrate 11, hydrophobic insulation film 20 disposed on the substrate 11, and hydrophilic liquid 14 and oil 16 which are filled in a region which is between the hydrophobic insulation film 20 and the substrate 12 and is divided by silicone rubber wall 22a and silicone rubber wall 22*b*. The region which is between the hydrophobic insulation film 20 and the substrate 12 and is divided by the silicone rubber wall 22*a* and the silicone rubber wall 22*b* is configured as a display member (display cell) that performs image display by the movement of the oil 16.

This oil 16 is a dye composition, and includes a nonpolar solvent and a porphyrin dye represented by Formula (1), which is described below.

Conventionally, various investigations have been made concerning the electrowetting technology.

However, when a porphyrin dye is included in the oil which serves as a fluid that undergoes image display, there are cases in which the solubility of the dye with respect to the nonpolar solvent is insufficient. Further, even in a case in which a porphyrin dye that exhibits a certain degree of solubility with respect to the nonpolar solvent is used, the responsiveness at the time of image display may be insufficient, or image disorder due to a back flow phenomenon may occur.

In connection with the above, according to the present invention, by selectively using a porphyrin dye represented by Formula (1), which is described below, as the porphyrin dye which is used for coloring of the oil phase in the electrowetting technology, the responsiveness at the time of image display is peculiarly improved, and the back flow when brought to be in a state of voltage being applied (voltage on state) is peculiarly suppressed, while securing the dye solubility.

The substrate 11 has base material 11*a* and electroconductive film 11*b* which is disposed on the base material 11*a* and is at least partly electroconductive, and thus is configured such that the whole of the substrate surface exhibits conductivity. Further, substrate 12 is provided at the position facing the substrate 11. Similar to the substrate 11, the substrate 12 has base material 12*a* and electroconductive film 12*b*, which is disposed on the base material 12*a* and is at least partly electroconductive, and thus is configured such that the whole of the substrate surface exhibits conductivity. In the present exemplary embodiment, the substrate 11 and the substrate 12 are each constituted of a transparent glass substrate and a transparent ITO film provided on the glass substrate.

The base material 11*a* and the base material 12*a* may be formed by using either a transparent material or an opaque material, according to the display form of the device. From the viewpoint of displaying an image, it is preferable that at least one of the base material 11*a* or the base material 12*a* has light transmitting property. Specifically, it is preferable that at least one of the base material 11*a* or the base material 12*a* has a transmission factor of 80% or higher (more preferably, 90% or higher) over the entire wavelength region of from 380 nm to 770 nm.

As the material used for the base material 11*a* and the base material 12*a*, for example, a glass substrate (for example, a non-alkali glass substrate, a soda glass substrate, a PYREX (registered trademark) glass substrate, a quartz glass substrate, or the like), a plastic substrate (for example, a polyethylene naphthalate (PEN) substrate, a polyethylene terephthalate (PET) substrate, a polycarbonate (PC) substrate, a polyimide (PI) substrate, or the like), a metal substrate such as an aluminum substrate or a stainless steel substrate, a semiconductor substrate such as a silicone substrate, or the like may be used. Among them, from the viewpoint of light transmitting property, a glass substrate or a plastic substrate is preferable.

Further, as the base material, a TFT substrate provided with a thin film transistor (TFT) can also be used. In this case, a form in which a electroconductive film is connected to the TFT (namely, a form in which the electroconductive film is a pixel electrode that is connected to the TFT) is preferable. By having this form, a voltage can be applied individually to every pixel and thus, it becomes possible to realize active driving of the entire image display device, similar to the case of a known liquid crystal display device equipped with a TFT.

In the TFT substrate, the configuration of the TFT, various wirings, a storage capacity, and the like may be a known configuration. For example, the configuration described in JP-A No. 2009-86668 can be referred to.

The electroconductive film 11*b* and the electroconductive film 12*b* may be either a transparent film or an opaque film, according to the display form of the device. The term "electroconductive film" refers to a film having electroconductivity, and the term "having electroconductivity" may refer to having at least an electric conductive property capable to apply a voltage, and specifically, refers to having the property of the surface resistance of 500Ω/□ or less (preferably 70Ω/□ or less, more preferably 60Ω/ or less, and even more preferably 50Ω/□ or less).

The electroconductive film may be either an opaque metal film such as a copper film, or a transparent film. However, from the viewpoint of imparting light transmitting property to perform image display, a transparent electroconductive film is preferable. It is preferable that the transparent electroconductive film has a transmission factor of 80% or higher (more preferably, 90% or higher) over the entire wavelength region of from 380 nm to 770 nm. Examples of the transparent electroconductive film include films containing at least one of indium tin oxide (ITO), indium zinc oxide (IZO), tin oxide, indium oxide, zirconium oxide, zinc oxide, cadmium oxide, or magnesium oxide. Among them, as the transparent electroconductive film, a film containing indium tin oxide (ITO) is preferable, from the viewpoints of the light transmitting property and electroconductivity.

The amount of tin oxide in the film containing ITO is preferably in a range of from 5% by mass to 15% by mass, and more preferably from 8% by mass to 12% by mass, from the viewpoint of reducing the resistance value.

The specific resistance of the electroconductive film is not particularly limited. For example, the specific resistance can be taken as $1.0 \times 10^{-3}$ Ω·cm or less.

A preferable example of a form is a form in which an independent voltage is applied to each display cell (pixel) by applying an independent voltage to every display pixel (display cell) with regard to the electroconductive film 11*b* of the substrate 11, while applying a common voltage to plural display cells that form display pixels with regard to the electroconductive film 12*b* of the substrate 12. For this form, the form of a known liquid crystal display device can be referred to.

In the present exemplary embodiment, the substrate 12 is provided as a substrate having electroconductivity, similar to the substrate 11, but in another embodiment, the substrate 12 may be a substrate that does not have an electroconductive film and does not have electroconductivity, and a voltage may be applied between the electroconductive film 11*b* and the hydrophilic liquid 14. In this case, the constitution of the substrate 12 is not particularly limited and, for example, a material exemplified above as the material used for the base material 12*a* can be used.

The hydrophobic insulation film 20 is disposed over the entire surface of the electroconductive film 11*b* of the substrate 11, and is at least in contact with the oil 16. This hydrophobic insulation film is mainly in the state of being in contact with the oil, when a voltage is not applied (at the time of image non-display), and when a voltage is applied (at the time of image display), the oil moves on its surface, and the region where the oil does not exist is brought into contact with the hydrophilic liquid.

The term "hydrophobic" refers to the property of the water contact angle of 60° or more (preferably 70° or more, and more preferably 80° or more) when water is contacted.

Specifically, the water contact angle is measured in accordance with the method described in "6. Sessile drop method" in JIS R3257 "Testing method of wettability of glass substrate surface".

More specifically, using a contact angle measuring device (trade name: Contact Angle Meter CA-A, manufactured by Kyowa Interface Science Co., Ltd.), a water droplet having a size of 20 points is made, then the water droplet is put out from the tip of a needle and is brought into contact with the hydrophobic insulation film to form a water droplet, which is allowed to stand for 10 seconds, and thereafter, the shape of the water droplet is observed from the peephole of the contact angle meter, whereby the contact angle θ (at 25° C.) is determined.

The term "insulation" refers to the property of the specific resistance of $10^7$ Ω·cm or more (preferably $10^8$ Ω·cm or more, and more preferably $10^9$ Ω·cm or more). The specific resistance can be measured in accordance with, for example, JISC2526.

As the hydrophobic insulation film, an insulation film that exhibits affinity with the oil 16 but has low affinity with the hydrophilic liquid 14 can be used; however, from the viewpoint of suppressing the deterioration of film caused by the movement of oil due to repeatedly performing application of a voltage, a film which has a crosslinking structure derived from a polyfunctional compound is preferable. Above all, the hydrophobic insulation film is more preferably a film which has a crosslinking structure derived from a polyfunctional compound having two or more polymerizable groups. The crosslinking structure is suitably formed by polymerization using at least one kind of polyfunctional compound (as necessary, together with other monomer).

In the present exemplary embodiment, the hydrophobic insulation film is constituted by a copolymer obtained by copolymerization using a five-membered cyclic perfluorodiene.

The polyfunctional compound is a compound having two or more polymerizable groups in a molecule thereof. Examples of the polymerizable groups include radical-polymerizable groups, cation-polymerizable groups, and condensation-polymerizable groups. Above all, a (meth)acryloyl group, an allyl group, an alkoxysilyl group, an α-fluoroacryloyl group, an epoxy group, —C(O)OCH=CH$_2$, and the like are preferable. The two or more polymerizable groups included in the polyfunctional compound may be the same or different from each other.

In the formation of the crosslinking structure, the polyfunctional compounds may be used alone or in a combination of two or more of them.

As the polyfunctional compound, a known polyfunctional, polymerizable compound (a radical-polymerizable compound, a cation-polymerizable compound, a condensation-polymerizable compound, or the like) can be used.

Examples of the polyfunctional compound include, for example, polyfunctional acrylates such as ethylene glycol di(meth)acrylate, diethylene glycol di(meth)acrylate, polyethylene glycol di(meth)acrylate, 1,6-hexanediol di(meth) acrylate, ethoxylated 1,6-hexanediol diacrylate, neopentyl glycol di(meth)acrylate, ethoxylated neopentyl glycol di(meth)acrylate, propoxylated neopentyl glycol di(meth) acrylate, tripropylene glycol di(meth)acrylate, polypropylene glycol diacrylate, 1,4-butanediol di(meth)acrylate, 1,9-nonanediol diacrylate, tetraethylene glycol diacrylate, 2-n-butyl-2-ethyl-1,3-propanediol diacrylate, dimethyloltricyclodecane diacrylate, neopentyl glycol hydroxypivalate diacrylate, 1,3-butylene glycol di(meth) acrylate, ethoxylated bisphenol-A di(meth)acrylate, propoxylated bisphenol-A di(meth)acrylate, cyclohexane dimethanol di(meth)acrylate, dimethyloldicyclopentane diacrylate, trimethylolpropane triacrylate, ethoxylated trimethylolpropane triacrylate, propoxylated trimethylolpropane triacrylate, pentaerythritol triacrylate, terramethylolpropane triacrylate, terramethylolmethane triacrylate, pentaerythritol tetraacrylate, caprolactone modified trimethylolpropane triacrylate, ethoxylated isocyanuric acid triacrylate, tris(2-hydroxyethyl) isocyanurate triacrylate, propoxylated glycerol triacrylate, tetramethylolmethane tetraacrylate, ditrimethylolpropane tetraacrylate, ethoxylated pentaerythritol tetraacrylate, dipentaerythritol hexaacrylate, neopentyl glycol oligoacrylate, 1,4-butanediol oligoacrylate, 1,6-hexanediol oligoacrylate, trimethylolpropane oligoacrylate, pentaerythritol oligoacrylate, urethane acrylate, epoxy acrylate, polyester acrylate and the like.

As the polyfunctional compound, other than the above compounds, a polyfunctional, polymerizable compound selected as appropriate from known polymerizable compounds described in, for example, paragraphs 0031 to 0035 of JP-A No. 2008-181067, paragraphs 0149 to 0155 of JP-A No. 2008-139378, and paragraphs 0142 to 0146 of JP-A No. 2010-134137 can be used.

It is preferable that the polyfunctional compound has three or more (preferably four or more, and more preferably five or more) polymerizable groups in one molecule. Thereby, the density of the crosslinking structure in the film can be further increased, and therefore, the deterioration of the hydrophobic insulation film when application of a voltage is repeatedly performed may be further suppressed.

The polyfunctional compound is preferably a fluorine-containing compound, and more preferably a polyfunctional compound in which the percentage of the fluorine content is 35% by mass or higher (preferably, 40% by mass or higher, and more preferably, 45% by mass or higher) based on the molecular weight.

When the polyfunctional compound includes fluorine atoms (specifically, when the percentage of the fluorine content is 35% by mass or higher based on the molecular weight), the hydrophobicity of the hydrophobic insulation film is further enhanced.

There is no particular limitation as to the upper limit of the percentage of the fluorine content in the polyfunctional compound, but the upper limit may be, for example, 60% by mass (preferably 55% by mass, and more preferably 50% by mass) based on the molecular weight.

The method of polymerizing the polyfunctional compound is preferably bulk polymerization, or solution polymerization.

The method of initiating polymerization may be, for example, a method using a polymerization initiator (for example, a radical initiator), a method of irradiating with light or a radiation, a method of adding an acid, a method of adding a photo acid generator and then irradiating with light, or a method of heating to undergo dehydration condensation. These polymerization methods and polymerization initiation methods are described in, for example, "Kobunshi Gosei Hoho (Polymer Synthesis Method)" by Teiji Tsuruta, revised edition (published by Nikkan Kogyo Shimbun, Ltd., 1971) and "Kobunshi Gosei no Jikkenho (Experimental Technique of Polymer Synthesis)" by Takayuki Ohtu and Masaetu Kinoshita, Kagaku-Dojin Publishing Company Inc., 1972, pages 124 to 154.

The hydrophobic insulation film is preferably prepared by using a curable composition which includes the polyfunctional compound.

One or two or more of the polyfunctional compounds may be incorporated in the curable composition. The curable composition may further include a monofunctional compound.

As the monofunctional compound, a known monofunctional monomer can be used.

The content (in the case of using two or more kinds thereof, the total content; hereinafter, the same applies.) of the polyfunctional compound in the curable composition is not particularly limited. However, from the viewpoint of curability, the content of the polyfunctional compound is preferably 30% by mass or higher, more preferably 40% by mass or higher, and particularly preferably 50% by mass or higher, with respect to the total solids of the curable composition. Here, the term "total solids" refers to all components except solvent.

It is preferable that the curable composition further includes at least one solvent.

Examples of the solvent include ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, 1-butanol, propylene glycol monomethyl ether, propylene glycol monomethyl ether acetate, cyclohexanone, cyclohexanol, ethyl lactate, methyl lactate, and caprolactam.

The content (in the case of using two or more kinds thereof, the total content) of the solvent in the curable composition is preferably from 20% by mass to 90% by mass, more preferably from 30% by mass to 80% by mass, and particularly preferably from 40% by mass to 80% by mass, with respect to the total mass of the curable composition.

It is preferable that the curable composition further includes at least one polymerization initiator.

As the polymerization initiator, a polymerization initiator which generates a radical by the action of at least one of heat or light is preferable.

As the polymerization initiator that initiates radical polymerization by the action of heat, an organic peroxide, an inorganic peroxide, an organic azo compound, an organic diazo compound, or the like can be used.

Examples of the organic peroxide include benzoyl peroxide, halogenbenzoyl peroxide, lauroyl peroxide, acetyl peroxide, dibutyl peroxide, cumene hydroperoxide, butyl hydroperoxide and the like. Examples of the inorganic peroxide include hydrogen peroxide, ammonium peroxodisulfate, potassium peroxodisulfate and the like. Examples of the organic azo compound include 2-azo-bis-isobutyronitrile, 2-azo-bis-propionitrile, 2-azo-bis-cyclohexane dinitrile and the like. Examples of the diazo compound include diazoaminobenzene, p-nitrobenzene diazonium and the like.

Examples of the polymerization initiator that initiates radical polymerization by the action of light include compounds such as hydroxyalkylphenones, aminoalkylphenones, acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums and the like.

Examples of the hydroxyalkylphenones include 2-hydroxy-2-methyl-1-phenyl-1-propan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 1-hydroxydimethyl phenyl ketone, and 1-hydroxycyclohexyl phenyl ketone.

Examples of the aminoalkylphenones include 2-dimethylamino-2-(4-methylbenzyl)-1-(4-morpholin-4-ylphenyl)butan-1-one, 2-benzyl-2-dimethylamino-1-(4-morpholinophenyl)-butanon-1, and 2-methyl-1-(4-methylthio phenyl)-2-morpholinopropan-1-one.

Examples of the acetophenones include 2,2-diethoxyacetophenone and p-dimethylacetophenone. Examples of the benzoins include benzoin benzenesulfonate, benzoin toluenesulfonate, benzoin methyl ether, benzoin ethyl ether, and benzoin isopropyl ether. Examples of the benzophenones include benzophenone, 2,4-dichlorobenzophenone, 4,4-dichlorobenzophenone, and p-chlorobenzophenone. Examples of the phosphine oxides include 2,4,6-trimethylbenzoyldiphenylphosphine oxide.

Further, a sensitizing dye may be used in combination with the above polymerization initiator.

The content of the polymerization initiator is not particularly limited, but the content is preferably from 0.1% by mass to 15% by mass, more preferably from 0.5% by mass to 10% by mass, and particularly preferably from 2% by mass to 5% by mass, with respect to the total solids of the curable composition.

The curable composition may include one or more additional components, as necessary.

Examples of the additional components include inorganic oxide fine particles, a silicone based antifouling agent or a fluorine-containing antifouling agent, a slipping agent, a polymerization inhibitor, a silane coupling agent, a surfactant, a thickener, and a leveling agent.

In a case in which the curable composition contain an additional component, the content of the additional component is preferably in a range of from 0% by mass to 30% by mass, more preferably in a range of from 0% by mass to 20% by mass, and particularly preferably in a range of from 0% by mass to 10% by mass, with respect to the total solids of the curable composition.

The film thickness of the hydrophobic insulation film is not particularly limited, but is preferably from 50 nm to 10 μm, and more preferably from 100 nm to 1 μm. The film thickness of the hydrophobic insulation film being within the above range is preferable in view of the balance between the insulation property and the drive voltage.

(Method of Forming Hydrophobic Insulation Film)

The hydrophobic insulation film can be suitably prepared by the following method. The method includes a curable layer forming process of forming a curable layer using the curable composition containing the polyfunctional compound on the surface side of the substrate 11 on which electroconductivity is provided, and a curing process of curing the curable layer by polymerizing the polyfunctional compound in the curable layer formed. By this method, a hydrophobic insulation film having a crosslinking structure is formed.

In a case of forming the hydrophobic insulation film 20, which is the curable layer, on the substrate 11, a known coating method or transfer method may be carried out.

In the case of the coating method, the curable composition is coated on the substrate 11 (and further, is preferably dried) to form a curable layer. As the method of coating, for example, a known method such as a spin coating method, a slit coating method, a dip coating method, an air knife coating method, a curtain coating method, a roller coating method, a wire bar coating method, a gravure coating method, or an extrusion coating method can be used.

In the case of the transfer method, a transfer material having a curable layer which is formed by using the curable composition is prepared in advance, and the curable layer of the transfer material is transferred onto the substrate 11, whereby a curable layer is formed on the substrate 11. For the details on the transfer method, description in, for example, paragraphs 0094 to 0121 of JP-A No. 2008-202006 or paragraphs 0076 to 0090 of JP-A No. 2008-139378 can be referred to.

The curing of the curable layer (polymerization of the polyfunctional compound) can be carried out by, for example, at least one of irradiation (hereinafter, also referred to as "exposure") with an actinic energy ray or heating.

As the actinic energy ray used in the exposure, for example, ultraviolet ray (g line, h line, i line, or the like), electron beam, or X-ray is preferably used. The exposure may be conducted by using a known exposure device of a proximity system, a mirror projection system, a stepper system, or the like.

The exposure value in the exposure may be, for example, from 10 mJ/cm$^2$ to 2000 mJ/cm$^2$, and is preferably from 50 mJ/cm$^2$ to 1000 mJ/cm$^2$.

Further, by exposing through a prescribed photomask in the exposure and subsequently developing using a developing solution such as an alkali solution, it is possible to obtain a hydrophobic insulation film which is patterned in a desired pattern.

The heating can be carried out by a known method using, for example, a hot plate or an oven.

The heating temperature can be set appropriately but, the heating temperature may be, for example, from 100° C. to 280° C., and is preferably from 150° C. to 250° C. The heating time can also be set appropriately but, the heating time may be, for example, from 2 minutes to 120 minutes, and is preferably from 5 minutes to 60 minutes.

In the present exemplary embodiment, the hydrophilic liquid 14 and the oil 16 are injected in the region between the hydrophobic insulation film 20 and the substrate 12.

Figure 2:
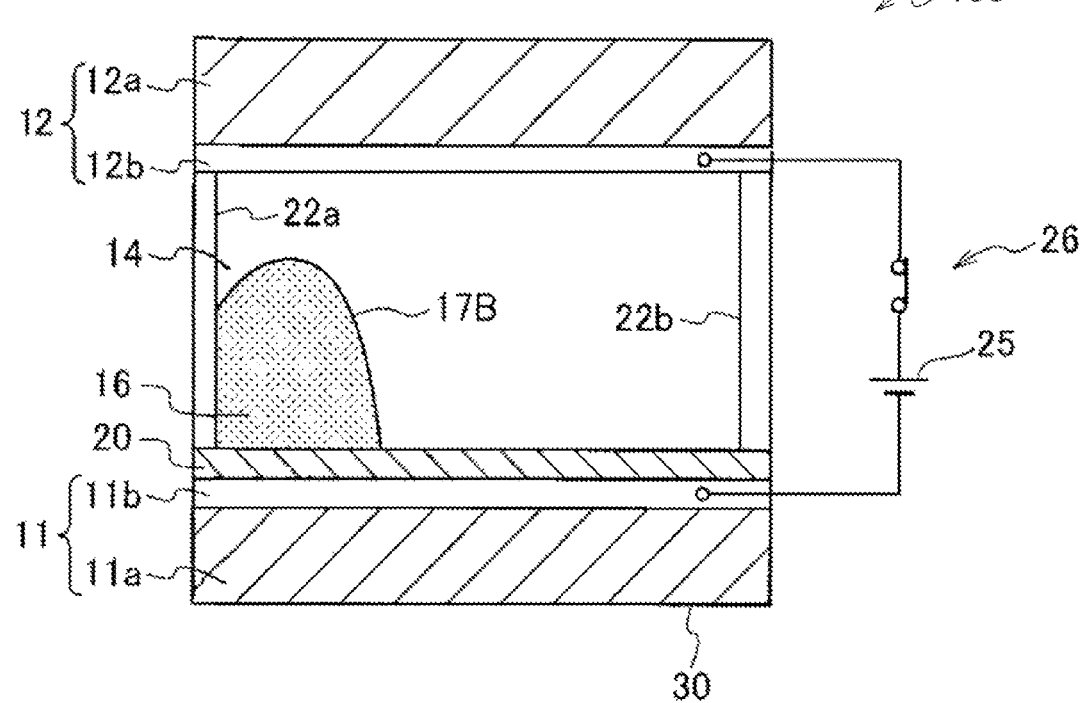
FIG. 2 is a schematic sectional view illustrating a state of voltage being applied (voltage on state) of the electrowetting display device of an exemplary embodiment of the present invention.

The hydrophilic liquid 14 and the oil 16 are liquids which do not mix with each other, and are separated from each other by interface 17A or interface 17B as shown in FIG. 1 and FIG. 2. It should be noted that, in FIG. 1 and FIG. 2, the interface 17A represents the interface between the hydrophilic liquid 14 and the oil 16 in the voltage off state, and the interface 17B represents the interface between the hydrophilic liquid 14 and the oil 16 in the voltage on state.

The oil 16 is a non-electroconductive liquid that includes at least a nonpolar solvent and a specific porphyrin dye, which is described below, as a coloring material. The oil is colored by the inclusion of the coloring material, and by the use of such a colored oil, a colored image is formed.

Here, the term "non-electroconductive" refers to the property of, for example, the specific resistance of 10$^6$ Ω·cm or more (preferably, 10$^7$ Ω·cm or more).

Further, it is preferable that the oil has a low relative dielectric constant.

Specifically, the relative dielectric constant of the oil is preferably in a range of 10.0 or less, and more preferably in a range of from 2.0 to 10.0. The relative dielectric constant being within this range is preferable in that the response speed is faster and driving (action) can be conducted at a lower voltage, as compared with the case in which the relative dielectric constant exceeds 10.0.

Here, the relative dielectric constant is a calculated value based on an electrical capacitance obtained by injecting the oil into a glass cell, which is equipped with an ITO transparent electrode and has a cell gap of 10 μm, and measuring the electrical capacitance of the cell thus obtained by using a model 2353 LCR meter (measuring frequency: 1 kHz), manufactured by NF Corporation, at 20° C. and 40% RH.

Further, it is preferable that the viscosity of the oil is 10 mPa·s or less, in terms of dynamic viscosity at 25° C. Above all, the viscosity is preferably 0.01 mPa·s or more, and more preferably from 0.01 mPa·s to 5 mPa·s. The viscosity of the oil being 10 mPa·s or less is preferable in that the response speed is faster and driving (action) can be conducted at a lower voltage, as compared with the case in which the viscosity exceeds 10 mPa·s.

Note that, the dynamic viscosity is a value measured by using a viscometer (model 500, manufactured by Toki Sangyo Co., Ltd.) under the condition of 25° C.

It is preferable that the oil does not substantially mix with the hydrophilic liquid described below.

Specifically, the solubility (at 25° C.) of the oil with respect to the hydrophilic liquid is preferably 0.1% by mass or lower, more preferably 0.01% by mass or lower, and particularly preferably 0.001% by mass or lower.

—Nonpolar Solvent—

It is preferable that the oil 16 contains at least one nonpolar solvent as the solvent. Here, the term "nonpolar solvent" refers to a solvent that has a low relative dielectric constant value (a so-called an apolor solvent).

Examples of the nonpolar solvent include an aliphatic hydrocarbon solvent (preferably, an aliphatic hydrocarbon solvent having from 6 to 30 carbon atoms), for example, n-hexane, n-decane, dodecane, tetradecane, hexadecane, or the like; a solvent obtained by substituting the above aliphatic hydrocarbon solvent with fluorine (for example, fluorocarbon oil or the like); and a silicone-containing solvent (for example, silicone oil or the like). Among them, an aliphatic hydrocarbon solvent is preferable.

A content of dissolved oxygen in the nonpolar solvent is preferably in a range of 10 ppm or less. When the content of dissolved oxygen exceeds 10 ppm, a component such as nonpolar solvent becomes easy to deteriorate, and the response speed becomes easy to slow down. The content of dissolved oxygen is the lower the better, and is preferably 8 ppm or less. The content of dissolved oxygen is measured with, for example, a dissolved oxygen meter (DO meter).

The content of the nonpolar solvent in the oil is preferably 30% by mass or higher, and more preferably 40% by mass or higher, with respect to the total mass of the oil. When the content of the nonpolar solvent is 30% by mass or higher, more excellent optical shutter characteristics can be realized. Further, the solubility of the dye in the oil may be maintained more satisfactorily.

Furthermore, the oil may contain other solvent other than the nonpolar solvent. In the case, the content of the nonpolar solvent is preferably 70% by mass or higher, and more preferably 90% by mass or higher, with respect to the total mass of the solvent included in the oil.

—Coloring Material—

The oil (for example, the oil 16) in the present invention contains at least one kind of porphyrin dye represented by Formula (1) below (hereinafter, may also be referred to as "specific porphyrin dye"), as the coloring material.

Since the specific porphyrin dye has high solubility with respect to a nonpolar solvent, which is a solvent of the oil, by the use of the specific porphyrin dye as the coloring material, the concentration of the dye in the oil can be increased and, as a result, the color density of the image can be heightened.

Further, by the use of the oil containing the specific porphyrin dye, the responsiveness at the time of image display is improved and the back flow when brought to be in the voltage on state is suppressed. It is guessed that the reason for the improvement in responsiveness and suppression of the back flow phenomenon is because the relative dielectric constant of the specific porphyrin dye is low.

The specific porphyrin dye is preferable as a dye having a hue of from yellow to cyan.

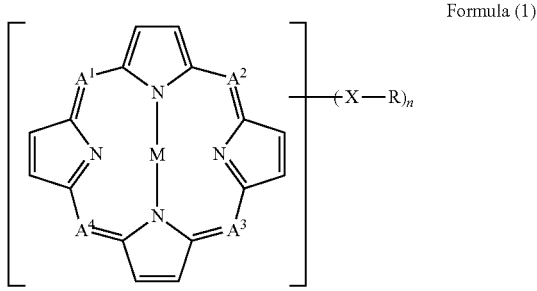

Formula (1)

In Formula (1), $A^1$ to $A^4$ each independently represent a nitrogen atom or $-C(R^1)=$; M represents a metal atom, a metal oxide, a metal hydroxide, a metal halide, or two hydrogen atoms; and —X—R represents a monovalent group that substitutes for a hydrogen atom on the pyrrole ring.

R represents an alkyl group having from 4 to 30 carbon atoms; X represents a single bond, an oxygen atom, a sulfur atom, or $-N(R^2)-$; and n represents an integer from 1 to 8.

$R^1$ represents a hydrogen atom, an alkyl group, an aryl group, or $-X^{11}-R^{11}$; and $R^2$ represents a hydrogen atom, an alkyl group, or an aryl group.

$R^{11}$ represents an alkyl group having from 4 to 30 carbon atoms; and $X^{11}$ represents a single bond, an oxygen atom, a sulfur atom, or $-N(R^{12})-$.

$R^{12}$ represents a hydrogen atom, an alkyl group, or an aryl group.

Each of $A^1$ to $A^4$ independently represents a nitrogen atom ($-N=$) or $-C(R^1)=$.

Here, $R^1$ represents a hydrogen atom, an alkyl group, an aryl group, or $-X^{11}-R^{11}$.

In a case in which $R^1$ represents an alkyl group, the alkyl group is preferably an alkyl group having from 1 to 20 carbon atoms (more preferably, from 1 to 15 carbon atoms). The alkyl group may be a straight chain alkyl group, a branched alkyl group, or a cyclic alkyl group. Further, as needs arise, the alkyl group may be substituted by the substituent described below.

In a case in which $R^1$ represents an aryl group, the aryl group is preferably an aryl group having from 6 to 20 carbon atoms (more preferably, from 6 to 15 carbon atoms), and is more preferably a phenyl group or a naphthyl group. As needs arise, the aryl group may be substituted by the substituent described below.

$X^{11}$ and $R^{11}$, in a case in which $R^1$ represents $-X^{11}-R^{11}$, are described below.

Among the specific porphyrin dyes, a dye in which each of $A^1$ to $A^4$ represents a nitrogen atom ($-N=$) is preferable as a dye having a hue of from violet to cyan, and a dye in which each of $A^1$ to $A^4$ represents $-C(R^1)=$ is preferable as a dye having a yellow hue.

From the viewpoint of more effectively exhibiting the effect of the present invention, each of $A^1$ to $A^4$ preferably represents a nitrogen atom.

M represents a metal atom, a metal oxide, a metal hydroxide, a metal halide, or two hydrogen atoms.

Examples of the metal atom include Zn, Mg, Si, Sn, Rh, Pt, Pd, Mo, Mn, Pb, Cu, Ni, Co, Fe, and the like.

Examples of the metal oxide include VO, TiO, and the like.

Examples of the metal hydroxide include $Si(OH)_2$ and the like.

Examples of the metal halide include AlCl, InCl, FeCl, $TiCl_2$, $SnCl_2$, $SiCl_2$, $GeCl_2$, and the like.

From the viewpoints of the hue and molar absorption coefficient, M preferably represents a metal atom, a metal halide, or two hydrogen atoms, more preferably Mg, Cu, Zn, AlCl, or two hydrogen atoms, and particularly preferably Mg or two hydrogen atoms.

In Formula (1), —X—R represents a monovalent group that substitutes for a hydrogen atom on one or more of the four pyrrole rings, which are included in Formula (1). In the porphyrin dye represented by Formula (1), the number of the positions capable of being substituted by —X—R is eight (the third position and the fourth position of each pyrrole ring).

In Formula (1), n represents the number of —X—R.

n represents an integer from 1 to 8; however, from the viewpoint of more effectively exhibiting the effect of the present invention, n preferably represents an integer from 4 to 8, more preferably an integer from 6 to 8, and most preferably 8.

In a case in which n represents an integer of 2 or more, —X—R exists as two or more groups, such groups may be the same or different from each other.

In —X—R, R represents an alkyl group having from 4 to 30 carbon atoms.

When the alkyl group represented by R has 3 carbon atoms or less, the solubility of the dye may be insufficient, the responsiveness may be deteriorated, or the back flow phenomenon may occur remarkably.

When the alkyl group represented by R has more than 30 carbon atoms, the molecular weight of the dye becomes large, and thus, the solubility or molar absorption coefficient of the dye may be lowered.

The alkyl group represented by R preferably has 4 to 20 carbon atoms, and particularly preferably from 8 to 10 carbon atoms.

The alkyl group represented by R may be a straight chain alkyl group, a branched alkyl group, or a cyclic alkyl group. However, from the viewpoint of the solubility of the dye, a branched alkyl group is preferable. Further, the alkyl group is particularly preferably a branched alkyl group having from 4 to 20 carbon atoms (more preferably, from 8 to 10 carbon atoms).

The alkyl group represented by R may be substituted by the substituent described below, as necessary. For example, from the viewpoints of improvement in responsiveness and suppression of back flow, it is also preferable that the alkyl group represented by R is a fluoroalkyl group.

In —X—R, X represents a single bond, an oxygen atom (—O—), a sulfur atom (—S—), or $-N(R^2)-$.

$R^2$ represents a hydrogen atom, an alkyl group, or an aryl group.

In a case in which $R^2$ represents an aryl group, the aryl group has the same definition as the aryl group described in the explanation of $R^1$, and its preferable scope is also the same.

In a case in which $R^2$ represents an alkyl group, the alkyl group has the same definition as the alkyl group described in the explanation of $R^1$, and its preferable scope is also the same.

X is not particularly limited, but from the viewpoint of the hue, X preferably represents a single bond, an oxygen atom, or a sulfur atom, and particularly preferably a single bond or a sulfur atom.

In a case in which $R^1$ represents $-X^{11}-R^{11}$, $R^{11}$ represents an alkyl group having from 4 to 30 carbon atoms, and $X^{11}$ represents a single bond, an oxygen atom, a sulfur atom, or $-N(R^{12})-$. $R^{12}$ represents a hydrogen atom, an alkyl group, or an aryl group.

$R^{11}$ and $R^{12}$ have the same definitions as R and $R^2$, respectively, and so are the preferable scopes.

Further, $X^{11}$ has the same preferable definition as X.

The porphyrin dye (specific porphyrin dye) represented by Formula (1) above may be substituted by a substituent, as necessary. The substitution position of the substituent is not particularly limited and, for example, R, $R^1$, and $R^2$ are described. Further, among the four pyrrole rings, the positions at which —X—R is not substituted are described.

Particularly, from the viewpoints of improvement in responsiveness and suppression of back flow, it is also preferable that the specific porphyrin dye is substituted by a fluorine atom.

Examples of the substituent, which the specific porphyrin dye may have, include the following substituents.

For example, a halogen atom (for example, a fluorine atom, a chlorine atom, a bromine atom, or the like; preferably, a fluorine atom), an alkyl group (preferably, a 2-ethylhexyl group), an alkenyl group, an aryl group, a heterocyclic group, a silyl group, an alkoxy group (preferably, a 2-ethylhexyloxy group), an aryloxy group, a heterocyclic oxy group, a silyloxy group, an acyloxy group, an alkoxycarbonyloxy group, an aryloxycarbonyloxy group, a carbamoyloxy group, a sulfamoyloxy group, an alkylsulfonyloxy group, an arylsulfonyloxy group, an acyl group, an alkoxycarbonyl group, an aryloxycarbonyl group, a carbamoyl group, an amino group, an anilino group, a heterocyclic amino group, a carbonamido group, a ureido group, an alkoxycarbonylamino group, an aryloxycarbonylamino group, a sulfonamido group, a sulfamoylamino group, an azo group, an alkylthio group (preferably, a 2-ethylhexylthio group), an arylthio group, a heterocyclic thio group, an alkylsulfinyl group, an arylsulfinyl group, an alkylsulfonyl group, an arylsulfonyl group, a sulfamoyl group, a phosphonyl group, a phosphinoylamino group, and the like.

In a case in which two or more substituents are present, these substituents may be the same or different from each other.

Further, in a case in which the substituent is a group capable of being further substituted, the substituent may be further substituted by any of the group described above. Note that, in a case in which the substituent has two or more substituents, the substituents may be the same or different from each other.

The molar absorption coefficient of the above-described specific porphyrin dye at the wavelength of maximum absorption is preferably 10,000 or more, more preferably 20,000 or more, even more preferably 25,000 or more, and particularly preferably 30,000 or more. When the molar absorption coefficient is 20,000 or more, high display performance and responsiveness can both be achieved easily, which is thus preferable.

In the present invention, the wavelength of maximum absorption indicates the wavelength of maximum absorption in the visible region (from 380 nm to 770 nm).

Further, the relative dielectric constant of the specific porphyrin dye is preferably 10.0 or less, more preferably 7.0 or less, and even more preferably 5.0 or less, from the viewpoints of further improving the responsiveness and further suppressing the back flow.

Here, the relative dielectric constant of the dye indicates the relative dielectric constant (calculated value) at the dye concentration of 100%, which is obtained by extrapolating the straight line (calibration curve) showing the relationship between the dye concentration and the relative dielectric constant in a diluted dye solution.

A relative dielectric constant of a diluted dye solution is determined as follows. Namely, in a state in which a diluted dye solution is held between two electrodes, which face each other at an interelectrode distance of 10 μm, an equivalent parallel capacitance is measured at a measuring frequency of 1 kHz, when a measuring voltage of 1.0 V is applied, and based on the equivalent parallel capacitance thus obtained, the relative dielectric constant is calculated according to the following equation.

Relative dielectric constant of diluted dye solution=Equivalent parallel capacitance×Interelectrode distance/Electrode area/Dielectric constant of vacuum($\epsilon_0$)

It is particularly preferable that the specific porphyrin dye has a molar absorption coefficient at the wavelength of maximum absorption of 20,000 or more and has a relative dielectric constant of 5.0 or less.

The specific porphyrin dye is preferably a dye having a solubility with respect to n-hexane at 25° C. and 0.1 MPa of 1% by mass or higher, from the viewpoint of the responsiveness of the oil phase when a voltage is applied, and is preferably a dye having excellent solubility with respect to a nonpolar solvent, specifically, excellent solubility with respect to a hydrocarbon solvent. The solubility being 1% by mass or higher, the specific porphyrin dye is more suitable for an electrowetting display device.

Note that, hereinafter, the "solubility with respect to n-hexane at 25° C. and 0.1 MPa" may also be referred to as, simply, "solubility".

In a case in which the specific porphyrin dye is applied to an oil which is a member for a display, the member being used for producing a display device that acts according to the theory of the electrowetting method, the solubility is more preferably 3% by mass or higher, and even more preferably 5% by mass or higher. The solubility is the higher the better, but the upper limit thereof is generally about 80% by mass.

In the above, a preferable range of the solubility of the specific porphyrin dye with respect to n-hexane is described; however, the preferable range of the solubility of the specific porphyrin dye with respect to n-decane is also the same as the above range.

The molecular weight of the specific porphyrin dye is preferably 200 or more but less than 3000, and more preferably 200 or more but less than 2000. When the molecular weight is 200 or more, solubility with respect to the nonpolar solvent can be secured, and when the molecular weight is less than 3000, the solubility with respect to the nonpolar solvent can be maintained within the extent of not impairing the responsiveness at the time of image display.

Specific examples (exemplary compounds 1 to 14) of the specific porphyrin dye described above are shown below. However, it should be construed that the invention is not limited thereto.

Note that, in the following specific examples, Et, Bu, Hex, and Oct represent an ethyl group, a butyl group, a hexyl group, and an octyl group, respectively. The wavy line in a group shown in the "R" column and the "$R^{11}$" column indicates a bonding site. Further, the specific examples in which "H" is described in the "M" column are specific examples in which M in Formula (1) represents two hydrogen atoms.

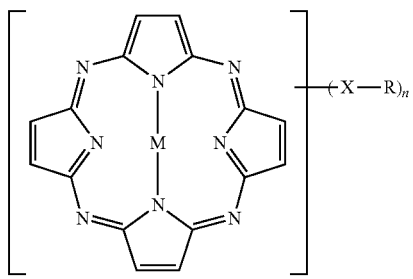
| No | X | R | n | M |
|----|---|---|---|---|
| 1 | S | 2-ethylhexyl | 8 | H |
| 2 | S | 2-ethylhexyl | 8 | Mg |
| 3 | NH | 2,4,4,6-tetramethyl branched alkyl | 6 | Cu |
| 4 | O | 2,4-diethyl-5,5,5-trifluoropentyl | 8 | Mg |
| 5 | — | 2-ethylhexyl | 4 | H |
| 6 | NBu | 2-ethyl-4-ethoxybutyl | 2 | Zn |
| 7 | — | n-heptyl | 6 | H |
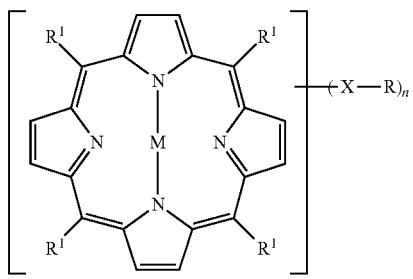
| No | R¹ | X | R | n | M |
|----|----|----|---|---|---|
| 8 | H | O | 2-ethylhexyl | 2 | Cu |

| No | R¹ | X¹¹ | R¹¹ | n | M |
|---|---|---|---|---|---|
| 9 | Et | S | [branched alkyl structure] | 8 | H |
| 10 | Hex | NH | [branched alkyl structure] | 8 | H |
| 11 | Et | O | [branched alkyl with CF₃ group] | 8 | H |
| 12 | Oct | — | [alkyl structure] | 4 | H |
| 13 | H | NH | [alkyl ether structure] | 4 | AlCl |

| No | R¹ | X¹¹ | R¹¹ | X | R | n | M |
|---|---|---|---|---|---|---|---|
| 14 | —X¹¹—R¹¹ | — | [branched alkyl] | — | [branched alkyl] | 8 | H |

Among the specific porphyrin dyes explained above, a specific porphyrin dye (tetraza dye), in which each of $A^1$ to $A^4$ in Formula (1) represents a nitrogen atom, can be synthesized according to the method described in, for example, Synthesis, page 686 (1991); Inorganic Chemistry, vol. 19, page 383 (1980); and Liquid Crystal, vol. 12, page 941 (1992).

Further, a specific porphyrin dye, in which each of $A^1$ to $A^4$ in Formula (1) represents —C(R¹)=, can be synthesized according to the method described in, for example, Journal of American Chemical Society, vol. 120, page 11802 (1998).

Specifically, a specific porphyrin dye in which R in Formula (1) represents a branched alkyl group can be synthesized by, for example, a method of reacting a dicyanoethylene derivative having a branched alkyl group in the presence of a metal catalyst, a method of reacting a pyrrole derivative having a branched alkyl group with an aldehyde compound, or a method of reacting a pyrrole derivative with an aldehyde compound having a branched alkyl group.

In the oil according to the present invention, one kind of coloring materials may be used alone, or two or more kinds of them may be used in combination.

For example, the oil according to the invention may be an oil configured to include one kind of the specific porphyrin dyes, or may be an oil configured to include two ore more kinds of them.

Further, the oil according to the invention may include a dye other than the specific porphyrin dye.

Examples of the dye other than the specific porphyrin dye include, but are not limited to, a methine dye, an azomethine dye, an azo dye, anthraquinone, phthalocyanine, and the like.

Examples of a form of the oil in the present invention include a form in which at least one kind of specific porphyrin dye is added to oil to constitute an oil having a hue of from yellow to cyan; a form in which at least one kind of specific porphyrin dye and at least one kind of phthalocyanine are added to oil to constitute an oil having a cyan hue; a form in which at least one kind of specific porphyrin dye and at least one kind of other dye (at least one of a magenta dye or a yellow dye) are added to oil to constitute an oil having a black hue; and the like.

In a case in which plural dyes are used in combination, as to the combination, it is preferable to mix and use a yellow dye having an absorption wavelength in a range of from 400 nm to 500 nm (including a specific porphyrin dye in which each of $A^1$ to $A^4$ above represents —C($R^1$)=), a magenta dye having an absorption wavelength in a range of from 500 nm to 600 nm, and a cyan dye having an absorption wavelength in a range of from 600 nm to 700 nm (including a specific porphyrin dye in which each of $A^1$ to $A^4$ above represents a nitrogen atom (—N=)).

The term "black" refers to the property in which, among the transmission factors at 450 nm, 500 nm, 550 nm, and 600 nm, respectively, the difference between the maximum transmission factor and the minimum transmission factor is 20% or less, and the difference is preferably 15% or less and particularly preferably 10% or less.

The total amount of the coloring materials including the specific porphyrin dye, which are contained in the oil, may be set, for example, 1% by mass or higher with respect to the total amount of the oil, and is preferably 5% by mass or higher and more preferably 10% by mass or higher. The content of the coloring materials is more preferably 20% by mass or higher, even more preferably 30% by mass or higher, and particularly preferably 40% by mass or higher, with respect to the total amount of the oil.

When the percentage of the content of the coloring materials included in the oil gets higher, the density and clearness of the displayed image and the like are further enhanced.

Whereas, as the percentage of the content of the coloring materials included in the oil gets higher, the responsiveness of the oil when a voltage is applied is deteriorated, and the back flow phenomenon in the voltage on state is also deteriorated, and thus the image display property tends to be lowered. Therefore, especially, in an oil composition in which the percentage of the coloring material content is 5% by mass or higher (more preferably 10% by mass or higher, and even more preferably 20% by mass or higher), the effects of the specific porphyrin dye on the improvement in responsiveness and reduction of back flow is more effectively exhibited.

Further, from the viewpoint of increasing the response speed, the total amount of the coloring materials is preferably 70% by mass or lower, more preferably 65% by mass or lower, and even more preferably 60% by mass or lower, with respect to the total amount of the oil.

With regard to the concentration (C) of a dye in the dye composition (oil), the dye composition may be prepared in any concentration depending on the purpose. When used as the dye for an electrowetting display, the concentration is generally 0.2% by mass or higher, and the dye is used by diluting with a nonpolar solvent according to the ∈C (∈ represents a molar absorption coefficient of the dye) value needed.

As the OD (image density) value of the electrowetting display device of the present invention gets higher, the distinguishability and clearness of the image are more enhanced. Therefore, the OD value at the maximum absorption wavelength of the dye per thickness of the oil layer is preferably OD=0.5/μm or more, more preferably 0.7/μm or more, and even more preferably 0.8/μm or more.

—Various Additives—

The oil may contain, as other components, various additives such as a surfactant, an ultraviolet absorbent, or an antioxidant, as necessary. In the case of containing an additive, the content of the additive is not particularly limited, but generally, the additive is used in an amount of about 20% by mass or less with respect to the total mass of the oil.

The hydrophilic liquid 14 is an electroconductive hydrophilic liquid. The term "electroconductive" refers to the property of the specific resistance of $10^5$ Ω·cm or less (preferably $10^4$ Ω·cm or less).

The hydrophilic liquid is configured to include an aqueous solvent. The hydrophilic liquid may be configured to further include an electrolyte as necessary.

Examples of the electrolyte include salts such as sodium chloride, potassium chloride, tetrabutylammonium chloride, or the like. The concentration of the electrolyte in the hydrophilic liquid is preferably from 0.1 mol/L to 10 mol/L, and more preferably from 0.1 mol/L to 5 mol/L.

As the aqueous solvent, water and alcohol are preferable. The aqueous solvent may further include an aqueous solvent other than water. Examples of the alcohol include ethanol, ethylene glycol, and glycerin.

From the viewpoint of responsiveness, it is preferable that the aqueous solvent does not contain a surfactant.

In the electrowetting display device 100, electric power supply 25 (a voltage application means) for applying a voltage between the electroconductive film 11b and the electroconductive film 12b through the hydrophilic liquid 14, and switch 26 for turning on/off this voltage are electrically connected.

In the present exemplary embodiment, application of a voltage (potential) to the hydrophilic liquid 14 can be carried out by applying a voltage to the electroconductive film 12b provided on the substrate 12. As described above, in the present exemplary embodiment, a surface of the substrate 12, the surface being on the side that contacts with the hydrophilic liquid 14, has electroconductivity (for example, an ITO film as an electroconductive film exists on a side of the base material 12a, the side contacting with the hydrophilic liquid 14), but the invention is not limited to this form. For example, the application of a voltage (potential) to the hydrophilic liquid 14 may be carried out by using an electrode which is inserted in the hydrophilic liquid 14, without providing electroconductive film 12b on the substrate 12.

Next, the actions (the voltage off state and the voltage on state) of the electrowetting display device 100 are described.

As shown in FIG. 1, in the voltage off state, since the affinity between the hydrophobic insulation film 20 and the oil 16 is high, the oil 16 is in a state of being in contact with the entire surface of the hydrophobic insulation film 20. When the switch 26 of the electrowetting display device 100 is turned on to perform application of a voltage, the interface between the hydrophilic liquid 14 and the oil 16 transforms from the interface 17A of FIG. 1 to the interface 17B of FIG. 2. In this process, the contact area between the hydrophobic insulation film 20 and the oil 16 is reduced and, as shown in FIG. 2, the oil 16 moves to the edge of the cell. This phenomenon is a phenomenon which is caused when a charge is generated at the surface of the hydrophobic insulation film 20 by the application of a voltage, and due to this charge, the hydrophilic liquid 14 pushes the oil 16, that has been in contact with the hydrophobic insulation film 20 and, as a result, the hydrophilic liquid 14 is brought into contact with the hydrophobic insulation film 20.

When the switch 26 of the electrowetting display device 100 is turned off to be in the voltage off state, the oil returns again to be in the state of FIG. 1.

In the electrowetting display device 100, the actions shown in FIG. 1 and FIG. 2 are performed, repeatedly.

In the above description, an exemplary embodiment of the electrowetting display device is explained with reference to FIG. 1 and FIG. 2; however, the present invention is not limited to the present exemplary embodiment.

For example, in FIG. 1 and FIG. 2, the electroconductive film 11b is disposed over the entire surface of the base material 11a in the substrate 11; however, a form in which the electroconductive film 11b is disposed only on a part of the surface of the base material 11a may also be employed. Further, in the substrate 12, the electroconductive film 12b is provided over the entire surface of the base material 12a; however, a form in which the electroconductive film 12b is disposed only on a part of the surface of the base material 12a may also be employed.

Further, in an exemplary embodiment, by adding one or more dyes to the oil 16, to color the oil to have a desired color (for example, black, red, green, blue, cyan, purple, magenta, yellow, or the like; preferably cyan, purple or yellow), the oil can function as a pixel of an electrowetting display device which performs image display. In this case, the oil 16 functions, for example, as an optical shutter that changes the on state and off state of the pixel. In this case, the electrowetting display device may be of any system of a transmission type, a reflection type, or a semi-transmission type.

Further, the electrowetting display device in the present exemplary embodiment may have an ultraviolet ray cut-off layer on the outer side (the side opposite to the surface that faces the oil) of at least one of the first substrate or the second substrate. Thereby, the lightfastness of the display device can be further improved.

As the ultraviolet ray cut-off layer, a known substance can be used and, for example, an ultraviolet ray cut-off layer (for example, an ultraviolet ray cut-off film) containing an ultraviolet absorbent can be used. It is preferable that the ultraviolet ray cut-off layer absorbs 90% or more of light having a wavelength of 380 nm.

The ultraviolet ray cut-off layer can be provided at the outer side of at least one of the first substrate or the second substrate by a known method such as pasting using an adhesive or the like.

In the electrowetting display device, by considering the structure shown in FIG. 1 (a region (display cell) obtained by dividing the region between the hydrophobic insulation film 20 and the substrate 12 with the silicone rubber wall 22a and the silicone rubber wall 22b, for example, in a lattice-like shape) as one pixel of a display member, and by two-dimensionally arranging two or more of the above display cells, it becomes possible to display an image. In this process, the electroconductive film 11b may be a film which is patterned independently for every one pixel (display cell) (for example, in the case of an active matrix type image display device and the like), or may be a film which is patterned in a striped shape lying across plural pixels (display cells) (for example, in the case of a passive matrix type image display device and the like).

In the electrowetting display device 100, by using, as the base material 11a and the base material 12a, a substrate having light transmitting property such as glass or plastic (polyethylene terephthalate, polyethylene naphthalate, or the like), and also using a film having light transmitting property as the electroconductive films 11b and 12b and the hydrophobic insulation film 20, a transmission type display device can be prepared. In the pixel of this transmission type display device, by providing a reflective plate at the outside of the display cell, a reflection type display device can also be prepared.

Further, by using, as the electroconductive film 11b, a film having an additional function as a reflective plate (for example, a metal film such as an Al film or an Al alloy film), or using, as the base material 11a, a substrate having an additional function as a reflective plate (for example, a metal substrate such as an Al substrate or an Al alloy substrate), a pixel of a reflection type image display device can also be prepared.

The other configuration of the display cell that constitutes the electrowetting display device 100 of the present exemplary embodiment or the image display device may be a known configuration described in, for example, JP-A No. 10-39800, Japanese National Phase Publication No. 2005-517993, JP-A Nos. 2004-252444 and 2004-287008, Japanese National Phase Publication Nos. 2005-506778 and 2007-531917, JP-A No. 2009-86668, and the like. Further, the configuration of a known active matrix type or passive matrix type liquid crystal display device can also be referred to.

The electrowetting display device may be constituted, as necessary, by using the same member as the member of a known liquid crystal display device, such as a back light, a spacer for adjusting the cell gap, or a sealant for sealing, in addition to the display pixel (display cell).

In this process, for example, the oil and the hydrophilic liquid may be applied to the region divided by the partition on the first substrate in accordance with an inkjet method.

Concerning a method of producing the electrowetting display device 100 of the present exemplary embodiment, for example, a method may be described, which includes a substrate preparing process of preparing the substrate 11; a process of forming the hydrophobic insulation film 20 on the side of the electroconductive surface of the substrate 11; a partition forming process of forming a partition that divides the face formed with the hydrophobic insulation film 20 of the substrate 11; an application process of applying (for example, by an inkjet method) the oil 16 and the hydrophilic liquid 14 to the region divided by the partition; and a cell forming process of placing the substrate 12 on a side of the substrate 11 after the application process, the side having been applied with the oil 16 and the hydrophilic liquid 14, to form a cell (display member); and, as needs arise, a sealing process of sealing the cell by adhering the substrate 11 and the substrate 12 at the circumference of the cell.

The adhesion of the substrate 11 and the substrate 12 can be conducted by using a sealant which is generally used in the preparation of liquid crystal display devices.

Further, a spacer forming process of forming a spacer for adjusting the cell gap may be provided, after the partition forming process but before the cell forming process.

EXAMPLES

Hereinafter, the present invention is specifically described with reference to Examples; however, the invention is by no means limited to the following Examples unless they are beyond the spirit of the invention.

Synthesis Example 1

Synthesis of Specific Porphyrin Dye (Compound P-1)

The compound P-1 described below (the above-described exemplary compound 2), which is a specific porphyrin dye, was synthesized in accordance with the following scheme 1.

Scheme 1

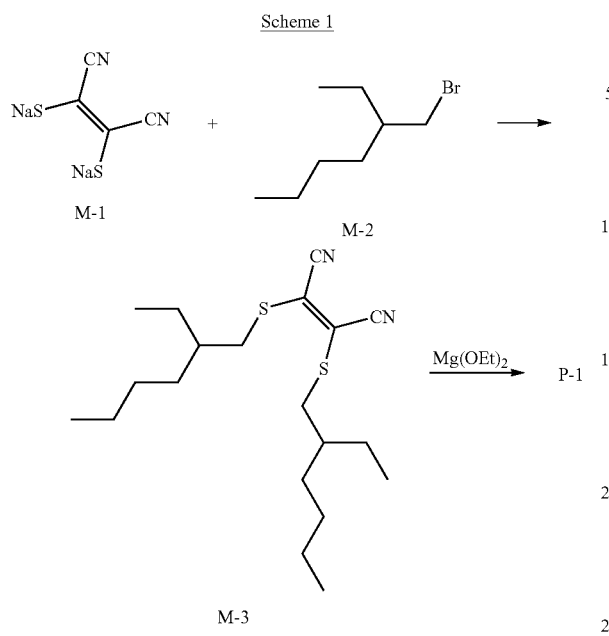

Details of the above scheme 1 is as follows.

(Synthesis of Compound M-3)

Compound M-1 (10.7 g) (manufactured by Tokyo Chemical Industry Co., Ltd.) and compound M-2 (27 g) (manufactured by Tokyo Chemical Industry Co., Ltd.) were added to 50 mL of methanol, and the mixture was heated under reflux for 4 hours. After cooling, the methanol was distilled off under reduced pressure, and the residue was purified by silica gel chromatography (eluent: hexane+ethyl acetate) to obtain the objected compound M-3 (15 g) as a pale yellow oil.

(Synthesis of Compound P-1)

20 mL of an n-propanol solution of magnesium diethoxide (0.66 g) were heated under reflux for 3 hours. To this solution that had been heated under reflux, the compound M-3 (2.1 g) was added, and the resulting mixture was further heated under reflux for 4 hours. After cooling, the n-propanol was distilled off under reduced pressure, and the residue was purified by silica gel chromatography (eluent: hexane+ethyl acetate ester) to obtain the objected compound P-1 (0.9 g) as a black blue oil.

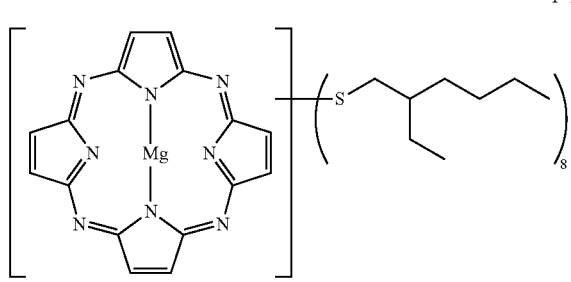

P-1

—Identification Data (Compound P-1)—

H-NMR (CDCl$_3$) δ 0.8 (t, 12H), 0.9 (m, 24H), 1.2-1.3 (m, 24H), 1.5-1.8 (m, 12H), 4.0-4.1 (m, 8H).

<Synthesis of Specific Porphyrin Dye (Compound P-2)>

The compound P-2 described below (the above-described exemplary compound 1), which is a specific porphyrin dye, was synthesized in accordance with the following scheme 2.

Scheme 2

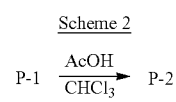

Details of the above scheme 2 is as follows.

Compound P-1 (0.5 g) was dissolved in 10 mL of chloroform, then 5 mL of acetic acid were added thereto, and the mixture was stirred at room temperature for 1 hour. After stirring, the resulting solution was neutralized by adding aqueous ammonia, and thereafter, the organic layer was extracted with ethyl acetate. The organic layer that had been extracted was dried over magnesium sulfate, and then the solvent was distilled off under reduced pressure. The residue was purified by silica gel chromatography (eluent: hexane) to obtain the objected compound P-2 (0.4 g) as a black blue oil.

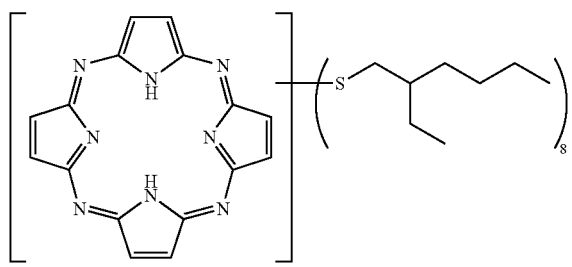

P-2

—Identification Data (Compound P-2)—

H-NMR (CDCl$_3$) δ 0.8 (t, 12H), 0.9 (m, 24H), 1.2-1.3 (m, 24H), 1.5-1.8 (m, 12H), 4.1-4.2 (m, 8H).

In the above description, synthesis examples of compounds P-1 and P-2, which are exemplified compounds of the specific porphyrin dye (porphyrin dye represented by Formula (1) above) are shown, but other specific porphyrin dyes can also be synthesized by a method substantially similar to the synthesis methods of compounds P-1 and P-2.

<Preparation of Comparative Compounds H-1 to H-3>

Comparative compounds H-1 to H-3, which are commercially available compounds, were prepared.

Comparative compound H-1 is tetraphenylporphine manufactured by Sigma-Aldrich Corporation.

Comparative compound H-2 was synthesized in a manner substantially similar to that in the synthesis of the compound P-1, except that iodomethane was used instead of using the compound M-2 (ethylhexyl bromide) in the synthesis of the compound P-1.

Comparative compound H-3 was synthesized in a manner substantially similar to that in the synthesis of the compound P-1, except that iodopropane was used instead of using the compound M-2 (ethylhexyl bromide) in the synthesis of the compound P-1.

H-1

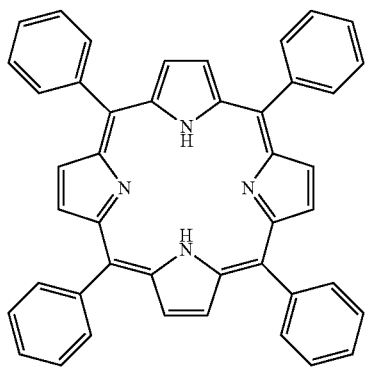

H-2

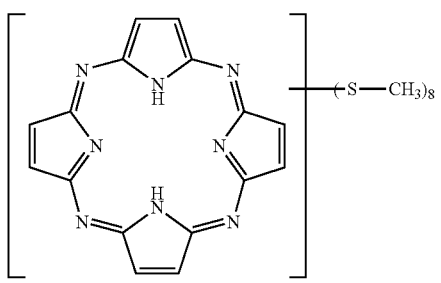

H-3

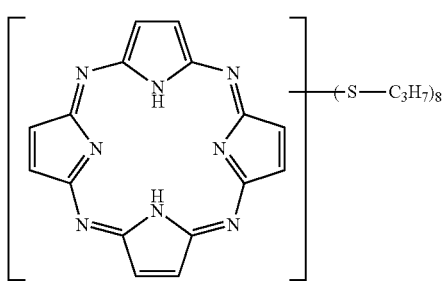

Example 1

Evaluation of Solubility and Relative Dielectric Constant of Dye (Solubility)

Each of the above dyes (compound P-1, compound P-2, comparative compound H-1, comparative compound H-2, or comparative compound H-3) was added to normal decane (hereinafter, may also be referred to as, simply, "decane"), which was used as a nonpolar solvent, (in this process, the addition amount was an amount equivalent to 40% by mass with respect to the total amount of the solution), and the solution thus obtained was heated to 50° C., and thereafter, the resulting solution was left for 12 hours at room temperature (25° C.). After leaving, based on the amount of the dye that was not dissolved and remained, the solubility (25° C.) of each dye with respect to decane was calculated.

Results are shown in the following Table 1.

TABLE 1

| Dye | Solubility in Decane (% by mass) | Remarks |
| --- | --- | --- |
| Exemplary compound P-1 | 2.0% by mass | Present Invention |

TABLE 1-continued

| Dye | Solubility in Decane (% by mass) | Remarks |
| --- | --- | --- |
| Exemplary compound P-2 | 40% by mass or more | Present Invention |
| Exemplary compound H-1 | less than 0.1% by mass | Comparative |
| Exemplary compound H-2 | less than 0.1% by mass | Comparative |
| Exemplary compound H-3 | 1.0% by mass | Comparative |

As shown in Table 1, the compounds P-1 and P-2 exhibited high solubility with respect to decane.

Accordingly, it was confirmed that the compounds P-1 and P-2 were preferable as the dye to be included in an oil of an electrowetting display device.

(Relative Dielectric Constant)

The relative dielectric constant of each dye was determined according to the following method.

Namely, the relative dielectric constants of diluted dye solutions of several concentrations, which had been prepared according to the method described below, were each measured according to the method described below, and from the obtained results, a straight line (calibration curve) showing the relationship between the dye concentration and the relative dielectric constant was prepared. By extrapolating the straight line (calibration curve), the relative dielectric constant (calculated value) at the dye concentration of 100% was determined, and the obtained value was taken as the relative dielectric constant of the dye.

As a result, it was revealed that the relative dielectric constant of the compound P-1 was 4.5, and the relative dielectric constant of the compound P-2 was 4.1. Thus, the compounds P-1 and P-2 each showed a low relative dielectric constant.

Accordingly, it was suggested that the responsiveness can be improved and the back flow can be suppressed, when the compound P-1 or the compound P-2 is included in an oil of an electrowetting display device.

—Method of Preparing Diluted Dye Solution—

The dye (compound P-1, compound P-2, comparative compound H-1, comparative compound H-2, or comparative compound H-3) and normal decane (n-decane) which is an organic solvent were mixed, to prepare normal decane solutions (diluted dye solutions) in several concentrations.

—Method of Measuring Relative Dielectric Constant of Diluted Dye Solution—

After placing a diluted dye solution between parallel plane glass substrates each equipped with an ITO (indium tin oxide) electrode, in which the substrates were arranged so as to face each other at an interelectrode distance of 10 μm, the equivalent parallel capacitance when a measuring voltage of 1.0 V was applied was measured at the measuring frequency of 1 kHz, by using a model 2353 LCR meter, manufactured by NF Corporation, under the conditions of 20° C. and 40% RH. Based on the equivalent parallel capacitance thus obtained, the relative dielectric constant of the diluted dye concentration was calculated according to the following equation.

Relative dielectric constant of diluted dye solution=Equivalent parallel capacitance×Interelectrode distance/Electrode area/Dielectric constant of vacuum($\epsilon_0$)

Example 2

Preparation of Dye Ink

Normal decane (n-decane) was subjected to argon gas bubbling so that the content of dissolved oxygen was adjusted to 10 ppm or less, and to the normal decane, the dye (compound) was added such that the dye concentration was 1% by mass, 10% by mass, or 40% by mass, as shown in Table 2 to Table 4 below. In this way, the dye inks used as oils were prepared.

—Preparation of Test Cell—

On a surface of the ITO film of a glass substrate (10 mm×10 mm) equipped with an indium tin oxide (ITO) film with a thickness of 100 nm as a transparent electrode, a fluorine-containing polymer (trade name: CYTOP, manufactured by Asahi Glass Co., Ltd., model number: CTL-809M) was coated such that the thickness was 600 nm, thereby forming a fluorine-containing polymer layer as a hydrophobic insulation film. Subsequently, on this fluorine-containing polymer layer, a frame-shaped silicone rubber wall which had been prepared by cutting out a tetrahedron having a size of 8 mm×8 mm×50 μm from the middle of a silicone rubber having a size of 1 cm×1 cm (a sealant having a thickness of 50 μm; SILI-US (trade name), manufactured by Fuso Rubber Co., Ltd.) was placed to form a display member. Into the region enclosed by this silicone rubber wall, the dye ink obtained as described above was injected such that the thickness became 4 μm. On the dye ink that had been injected, ethylene glycol (a hydrophilic liquid) was injected such that the thickness became 46 μm. On this assembly, a glass substrate equipped with an ITO film was further placed such that the ITO film faced the dye ink or the ethylene glycol, and was fixed. In this way, an electrowetting test cell having a structure shown in FIG. 1 was prepared.

—Evaluation—

To each of the ITO films (transparent electrodes) of the two glass substrates each equipped with an ITO film, a DC voltage of 100 V was applied (a minus voltage was applied to the ITO electrode on the side having thereon the fluorine-containing polymer (hydrophobic insulation film)) by using a signal generator, and the display cell (display cell 30 in FIG. 2) was observed. As a result, it was confirmed that the dye ink had moved toward one direction on the surface of the fluorine-containing polymer layer, and the area of the dye ink covering the fluorine-containing polymer layer was reduced. The responsiveness (the response time and the area shrinkage factor described below) of the dye ink in this process, and the degree of the back flow phenomenon (the back flow ratio described below), when kept in the voltage on state as it was, were evaluated.

The reduction of the area by application of a voltage was evaluated based on the area shrinkage factor [%] calculated according to the following Equation (1), and the back flow phenomenon was evaluated based on the back flow ratio [%] calculated according to the following Equation (2).

a) Response time [msec]=Time needed to reach the most shrink state from the initiation of application, when the application of a voltage is initiated from the voltage non-applying state b) Area shrinkage factor [%]=(Area of the dye ink when the dye ink shrinks at the most)/(Area of the dye ink before application of voltage)×100     Equation (1)

c) Back flow ratio [%]=(Area of the dye ink after 5 seconds have past in the voltage on state)/(Area of the dye ink when the dye ink shrinks at the most)×100     Equation (2)

TABLE 2

[Dye density: 1% by mass]

| Dye (Compound) | Area shrinkage factor [%] | Response time [mSec] | Back flow ratio [%] | Remarks |
|---|---|---|---|---|
| 1 P-1 | 25 | 200 mSec or less | 110 | Present Invention |
| 2 P-2 | 28 | 200 mSec or less | 110 | Present Invention |
| 3 H-3 | 28 | 200 mSec to 1 sec | 110 | Comparative |

In table 2, when Area shrinkage is 100%, it is meant that the area is not shrunk.

TABLE 3

[Dye density: 10% by mass]

| Dye (Compound) | Area shrinkage factor [%] | Response time [mSec] | Back flow ratio [%] | Remarks |
|---|---|---|---|---|
| 1 P-2 | 13 | 200 mSec or less | 105 | Present Invention |

In table 3, when Area shrinkage is 100%, it is meant that the area is not shrunk.

TABLE 4

[Dye density: 40% by mass]

| Dye (Compound) | Area shrinkage factor [%] | Response time [mSec] | Back flow ratio [%] | Remarks |
|---|---|---|---|---|
| 1 P-2 | 15 | 200 mSec or less | 105 | Present Invention |

In table 4, when Area shrinkage is 100%, it is meant that the area is not shrunk.

As shown in Table 2 to Table 4, it is understood that the electrowetting display devices according to the present invention exhibited good responsiveness and the back flow ratio was low. In particular, it is understood that, even when the dye concentration became higher (Table 3 and Table 4), the responsiveness was maintained and the back flow ratio was low.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An electrowetting display device, comprising a display member having:
 a first substrate, at least one surface of which is at least partly electroconductive;
 a second substrate disposed so as to face the at least partly electroconductive surface of the first substrate;
 a hydrophobic insulation film disposed on at least a part of the at least partly electroconductive surface of the first substrate;
 a non-electroconductive oil that is provided movably on the hydrophobic insulation film, between the hydrophobic insulation film and the second substrate, and that comprises a nonpolar solvent and a porphyrin dye represented by the following Formula (1); and
 an electroconductive hydrophilic liquid provided between the hydrophobic insulation film and the second substrate so as to contact the oil,
 wherein an image is displayed by changing the shape of an interface between the oil and the hydrophilic liquid by applying a voltage between the hydrophilic liquid and the at least partly electroconductive surface of the first substrate:

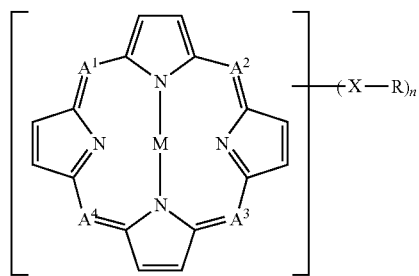

Formula (1)

wherein, in Formula (1), each of $A^1$ to $A^4$ independently represents a nitrogen atom or —$C(R^1)$=; M represents a metal atom, a metal oxide, a metal hydroxide, a metal halogenide or two hydrogen atoms; —X—R represents a monovalent group that substitutes to a pyrrole ring; R represents an alkyl group having 4 to 30 carbon atoms; X represents a single bond, an oxygen atom, a sulfur atom or —$N(R^2)$—; $R^1$ represents a hydrogen atom, an alkyl group, an aryl group or —$X^{11}$—$R^{11}$; $R^2$ represents a hydrogen atom, an alkyl group or an aryl group; $R^{11}$ represents an alkyl group having 4 to 30 carbon atoms; $X^{11}$ represents a single bond, an oxygen atom, a sulfur atom or —$N(R^{12})$—; $R^{12}$ represents a hydrogen atom, an alkyl group or an aryl group; and n represents an integer from 1 to 8.

2. The electrowetting display device according to claim 1, wherein, in Formula (1), each of R and $R^{11}$ independently represents a branched alkyl group.

3. The electrowetting display device according to claim 1, wherein, in Formula (1), each of R and $R^{11}$ independently represents an alkyl group having 4 to 20 carbon atoms.

4. The electrowetting display device according to claim 1, wherein, in Formula (1), each of $A^1$ to $A^4$ represents a nitrogen atom.

5. The electrowetting display device according to claim 4, wherein, in —X—R in Formula (1), X represents a single bond, an oxygen atom or a sulfur atom, and R represents an alkyl group having 8 to 10 carbon atoms, a fluoroalkyl group having 8 to 10 carbon atoms or an alkoxyalkyl group having 8 to 10 carbon atoms.

6. The electrowetting display device according to claim 4, wherein, in Formula (1), —X—R represents —S—$CH_2$—$CH(C_2H_5)$—$C_4H_9$.

7. The electrowetting display device according to claim 1, wherein the hydrophobic insulation film is a film comprising a fluorocarbon based polymer.

8. The electrowetting display device according to claim 1, wherein a concentration of the porphyrin dye represented by Formula (1) in the non-electroconductive oil is from 1% by mass to 65% by mass.

9. The electrowetting display device according to claim 1, wherein a relative dielectric constant of the non-electroconductive oil is in a range of from 2.0 to 10.0.

10. The electrowetting display device according to claim 1, wherein a viscosity of the non-electroconductive oil is in a range of from 0.01 mPa·s to 10 mPa·s.

11. The electrowetting display device according to claim 1, wherein an amount of dissolved oxygen in the non-polar solvent is in a range of 10 ppm or less.

12. The electrowetting display device according to claim 1, wherein the hydrophilic liquid comprises water and an electrolyte, and a content of the electrolyte is in a range of from 0.1 mol/L to 10 mol/L.

13. A dye composition for an electrowetting display, the dye composition comprising a non-polar solvent and a porphyrin dye represented by the following Formula (1):

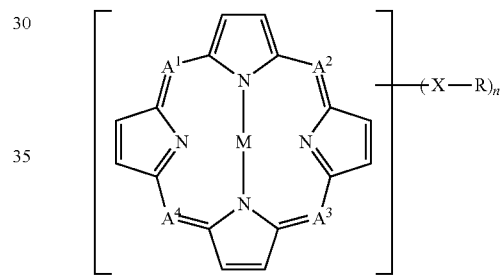

Formula (1)

wherein, in Formula (1), each of $A^1$ to $A^4$ independently represents a nitrogen atom or —$C(R^1)$=; M represents a metal atom, a metal oxide, a metal hydroxide, a metal halogenide or two hydrogen atoms; —X—R represents a monovalent group that substitutes to a pyrrole ring; R represents an alkyl group having 4 to 30 carbon atoms; X represents a single bond, an oxygen atom, a sulfur atom or —$N(R^2)$—; $R^1$ represents a hydrogen atom, an alkyl group, an aryl group or —$X^{11}$—$R^{11}$; $R^2$ represents a hydrogen atom, an alkyl group or an aryl group; $R^{11}$ represents an alkyl group having 4 to 30 carbon atoms; $X^{11}$ represents a single bond, an oxygen atom, a sulfur atom or —$N(R^{12})$—; $R^{12}$ represents a hydrogen atom, an alkyl group or an aryl group; and n represents an integer from 1 to 8.

14. The dye composition for an electrowetting display according to claim 13, wherein, in Formula (1), each of R and $R^{11}$ independently represents a branched alkyl group.

15. The dye composition for an electrowetting display according to claim 13, wherein, in Formula (1), each of R and $R^{11}$ independently represents an alkyl group having 4 to 20 carbon atoms.

16. The dye composition for an electrowetting display according to claim 13, wherein, in Formula (1), each of $A^1$ to $A^4$ represents a nitrogen atom.

* * * * *